(12) United States Patent
Yang

(10) Patent No.: US 7,275,323 B2
(45) Date of Patent: Oct. 2, 2007

(54) LONG-HANDLED GRASS SHEARS WITH A DETACHABLE CONNECTING DEVICE

(76) Inventor: Chung-Cheng Yang, No. 25, Alley 29, Lane 190, Jen-Ai Rd., Dali City, Taichung Hsien (TW)

(*) Notice: Subject to any disclaimer, the term of this patent is extended or adjusted under 35 U.S.C. 154(b) by 397 days.

(21) Appl. No.: 11/068,586

(22) Filed: Feb. 28, 2005

(65) Prior Publication Data

US 2006/0191141 A1  Aug. 31, 2006

(51) Int. Cl.
*B26B 13/26* (2006.01)
(52) U.S. Cl. ............... 30/244; 30/245; 30/257; 30/296.1; 30/298; 56/241
(58) Field of Classification Search ............... 30/231, 30/244–246, 248–251, 254, 296.1, 298; 56/239, 56/241; D8/4, 5
See application file for complete search history.

(56) References Cited

U.S. PATENT DOCUMENTS

| 646,048 | A | * | 3/1900 | Donzella | 30/251 |
| 1,823,199 | A | * | 9/1931 | Huxman | 30/248 |
| 2,469,983 | A | * | 5/1949 | Newbold | 30/248 |
| 2,748,554 | A | * | 6/1956 | Wallace | 56/241 |
| 2,957,297 | A | * | 10/1960 | Zoetemelk | 30/248 |
| 3,039,190 | A | * | 6/1962 | Wallace | 30/251 |
| 3,317,997 | A | * | 5/1967 | Hedstrom et al. | 30/248 |
| 3,384,962 | A | * | 5/1968 | Duffy et al. | 30/248 |
| 6,571,479 | B1 | * | 6/2003 | Wu | 30/248 |
| 6,993,895 | B2 | * | 2/2006 | Wu | 56/241 |
| 2003/0061716 | A1 | * | 4/2003 | Chen | 30/296.1 |
| 2003/0145470 | A1 | * | 8/2003 | Huang | 30/249 |
| 2003/0182805 | A1 | * | 10/2003 | Lau | 30/251 |

* cited by examiner

*Primary Examiner*—Boyer D. Ashley
*Assistant Examiner*—Jason Prone
(74) *Attorney, Agent, or Firm*—Alan Kamrath; Kamrath & Associates P.A.

(57) ABSTRACT

A long-handled shears with a detachable connecting device has an operational grip stick with an elongated tube and a wire, a grass shears, and a connecting device attached between the grip stick and the grass shears. The ball is attached to the wire of the grip stick. The base is mounted on the elongated tube, allows the wire to extend through the base and engages the grass shears by a clamp. The engaging block is movably mounted inside a grip of the grass shears and has a ball recess. When the grip of the grass shears is compressed, the engaging block moves aside to reveal the ball recess to allow the ball to enter the ball recess. Then, the handle is released to lock the ball inside the ball recess. By engaging the ball and the engaging block, the grass shears detachably attaches to the grip stick conveniently.

5 Claims, 7 Drawing Sheets

LONG-HANDLED GRASS SHEARS WITH A DETACHABLE CONNECTING DEVICE

BACKGROUND OF THE INVENTION

1. Field of the Invention

The present invention relates to long-handled grass shears, and more particularly to long-handled grass shears that have a detachable connecting device to conveniently and detachably engage grass shears.

2. Description of Related Art

Many types of gardening shears exist such as grass shears, short topiary shears, long-handled pruning shears, etc. Most long-handled pruning shears are used by people in standing positions, and with reference to FIG. 7, grass shears are used by people in squatting positions. Each kind of gardening shears has a specific purpose. Specifically, long-handled pruning shears are not suitable for use as grass shears, and grass shears cannot be used when a person is in a standing position. When a person wants to trim the grass in a standing position, special long-handled grass shears are needed. However, obtaining two kinds of grass shears costs more money and increases space needed for storage.

The present invention has arisen to mitigate or obviate the disadvantages of the conventional gardening shears.

SUMMARY OF THE INVENTION

The main objective of the present invention is to provide long-handled grass shears with a detachably connecting device to conveniently turn grass shears into long-reach grass shears.

Further benefits and advantages of the present invention will become apparent after a careful reading of the detailed description with appropriate references to the accompanying drawings.

DETAILED DESCRIPTION OF THE PREFERRED EMBODIMENT

Figure 1:
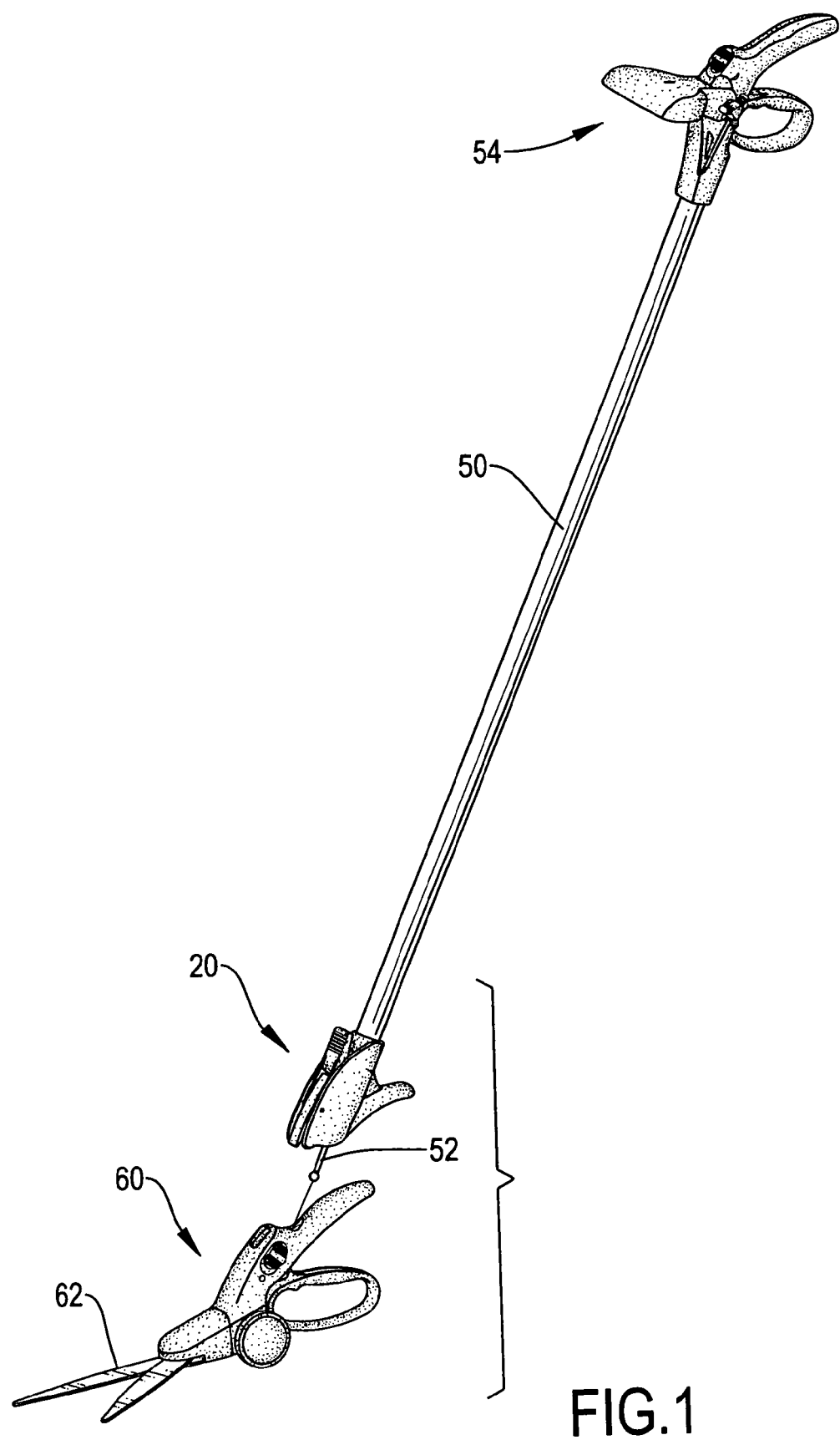
FIG. 1 is a perspective view of long-handled grass shears with a detachably connecting device in accordance with the present invention.

With reference to FIG. 1, a long-handled shears with a detachable connecting device in accordance with the present invention comprises an operational grip stick, a grass shears (60) and a connecting device.

The operational grip stick has an elongated tube (50), a handle (54) and a wire (52). The elongated tube (50) is hollow and has a proximal end and a distal end. The handle (54) is attached to the distal end of the elongated tube (50). The wire (52) is mounted through the elongated tube (50) and has a distal end and a proximal end. The distal end is connected to the handle (54) and the proximal end is threaded.

Figure 2:
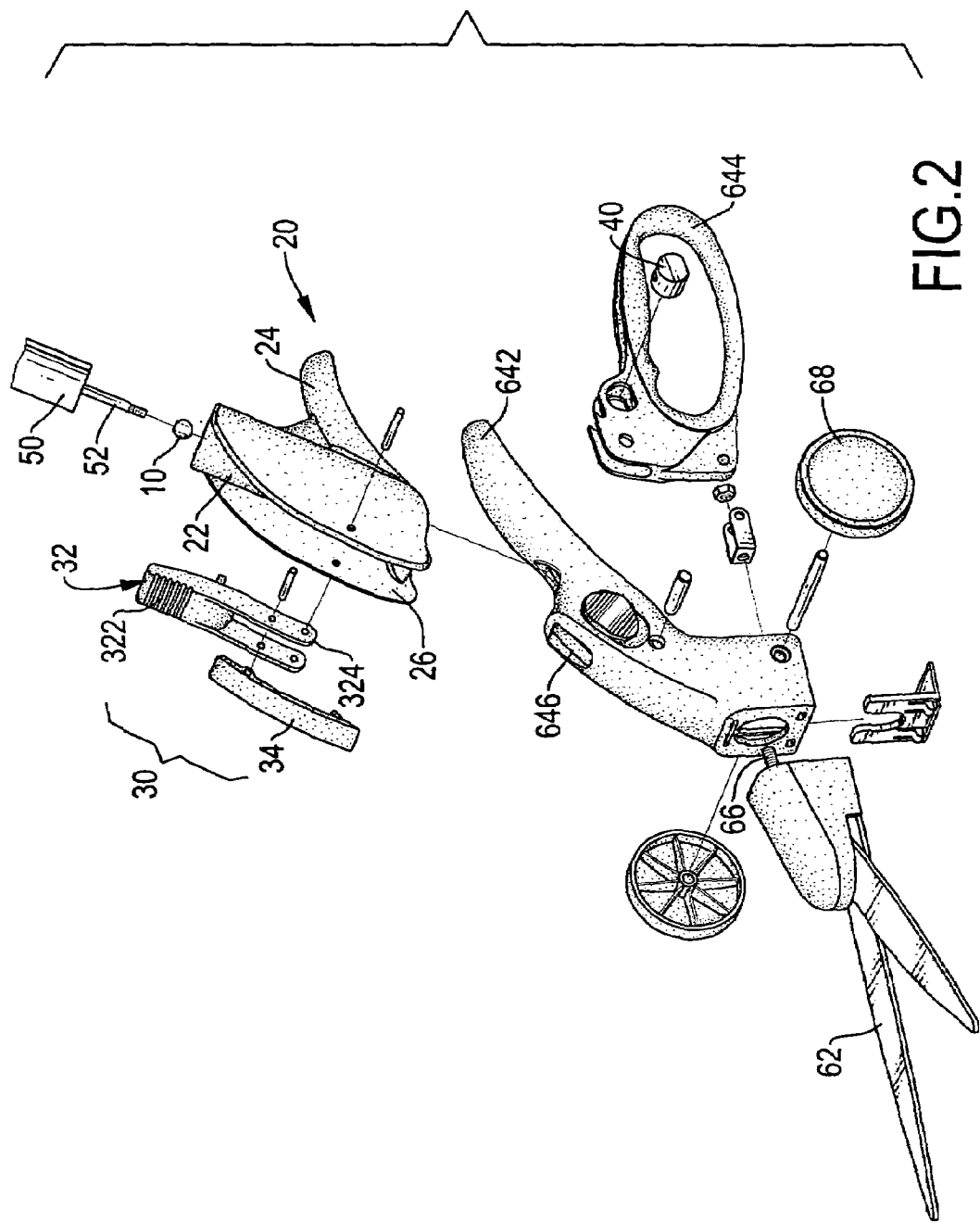
FIG. 2 is a partially exploded perspective view of grass shears and a connecting device for long-handled grass shears in accordance with the present invention.

With further reference to FIG. 2, the grass shears (60) comprises a stationary grip (642), a pivoting grip (644), a pair of blades (62), a pulling rod (66), an optional pair of wheels (68) and a locking device. The stationary grip (642) is a shell and has a front end, a rear end, a top surface, two sides, a bottom, a front opening, a top opening and a latch notch (646). The front opening is formed in the front end. The top opening is formed through the top surface. The latch notch (646) is formed in the top surface toward the front end. The pivoting grip (644) is attached pivotally to the bottom of the stationary grip (642) and has a front end, a top surface and a transverse recess. The transverse recess is formed near the top surface toward the front end. The pair of blades (62) is attached to the front end of the stationary grip (642) such that the blades (62) pivot in a scissor movement. The pulling rod (66) is attached to the pair of blades (62), passes through the front of the stationary grip (642) and is attached to and driven by the pivoting grip (644) to make the pair of blades (62) cut. The pair of wheels (68) are rotatably mounted respectively on the sides of the stationary grip (642) near the bottom so the grass shears (60) can roll on the ground while cutting grass. The locking device selectively holds the pair of blades (62) closed when the grass shears (60) are not in use and may be a thumb slide (648, shown in FIG. 3) or a handle latch. The locking slide (648) has a mechanism that holds the pair of blades (62) together, and the handle latch is a loop pivotally attached to the rear end of one grip (642, 644) and selectively loops over and holds the other grip (644, 642) when the grips are squeezed together.

The connecting device connects the operational grip stick to the grass shears (60) and comprises a ball (10), a base (20) and an engaging block (40).

The ball (10) is attached to the proximal end of the wire (52) and has an outer surface and a threaded hole. The threaded hole is defined in the outer surface and screws onto the threaded proximal end of the wire (52).

The base (20) is mounted on the proximal end of the elongated tube (50), is attached selectively to the stationary grip (642) of the grass shears (60) and comprises a top, a bottom, a front, a rear, a sleeve (22), a rear tail (24), a front bracket (26) and a clamp (30).

The sleeve (22) is hollow, is formed on the top of the base (20) and holds the proximal end of the elongated tube (50) and the wire (52) extends through the sleeve (22).

Figure 3:
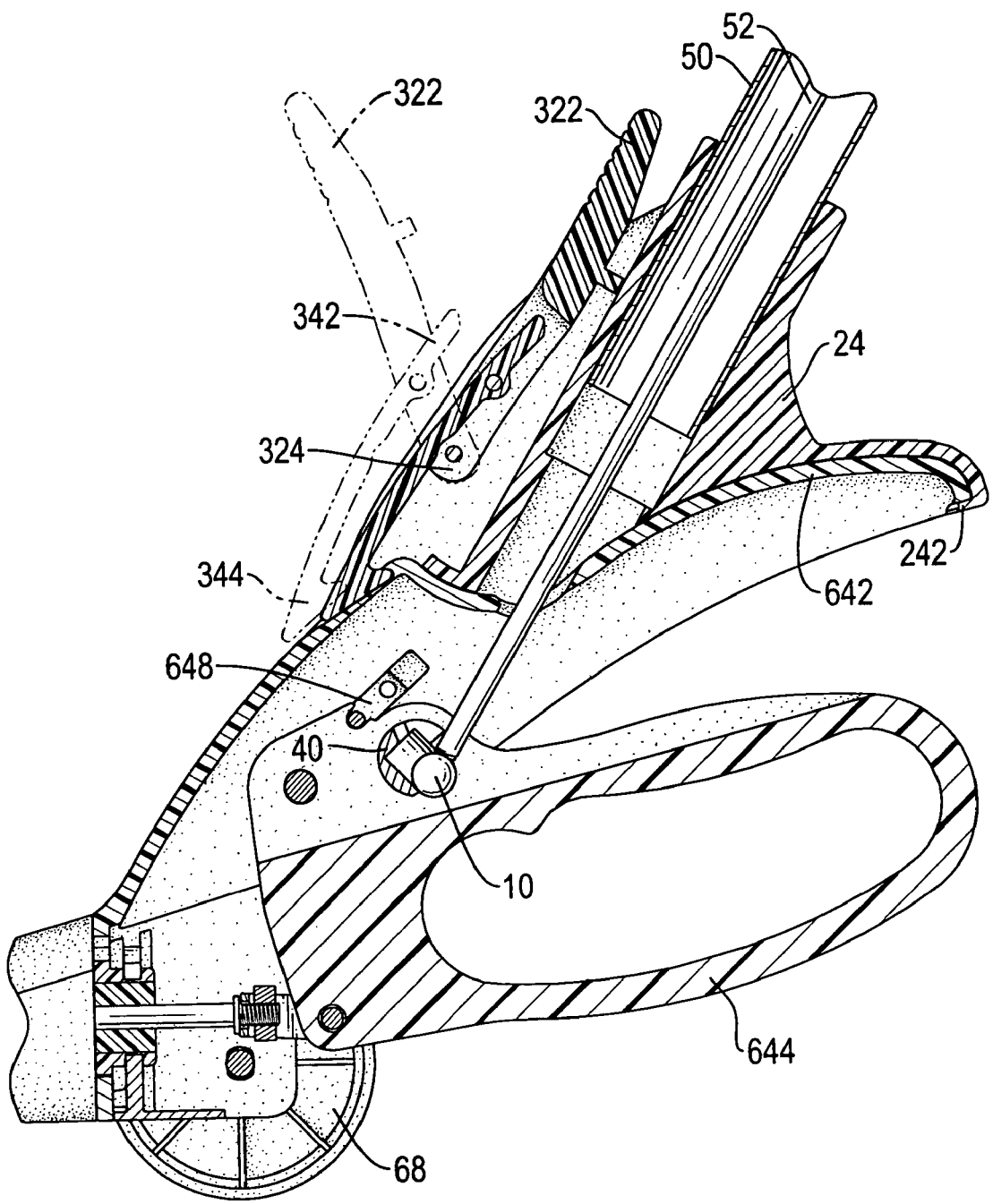
FIG. 3 is an operational side view in partial section of the connecting device and the grass shears in FIG. 2.
Figure 4:
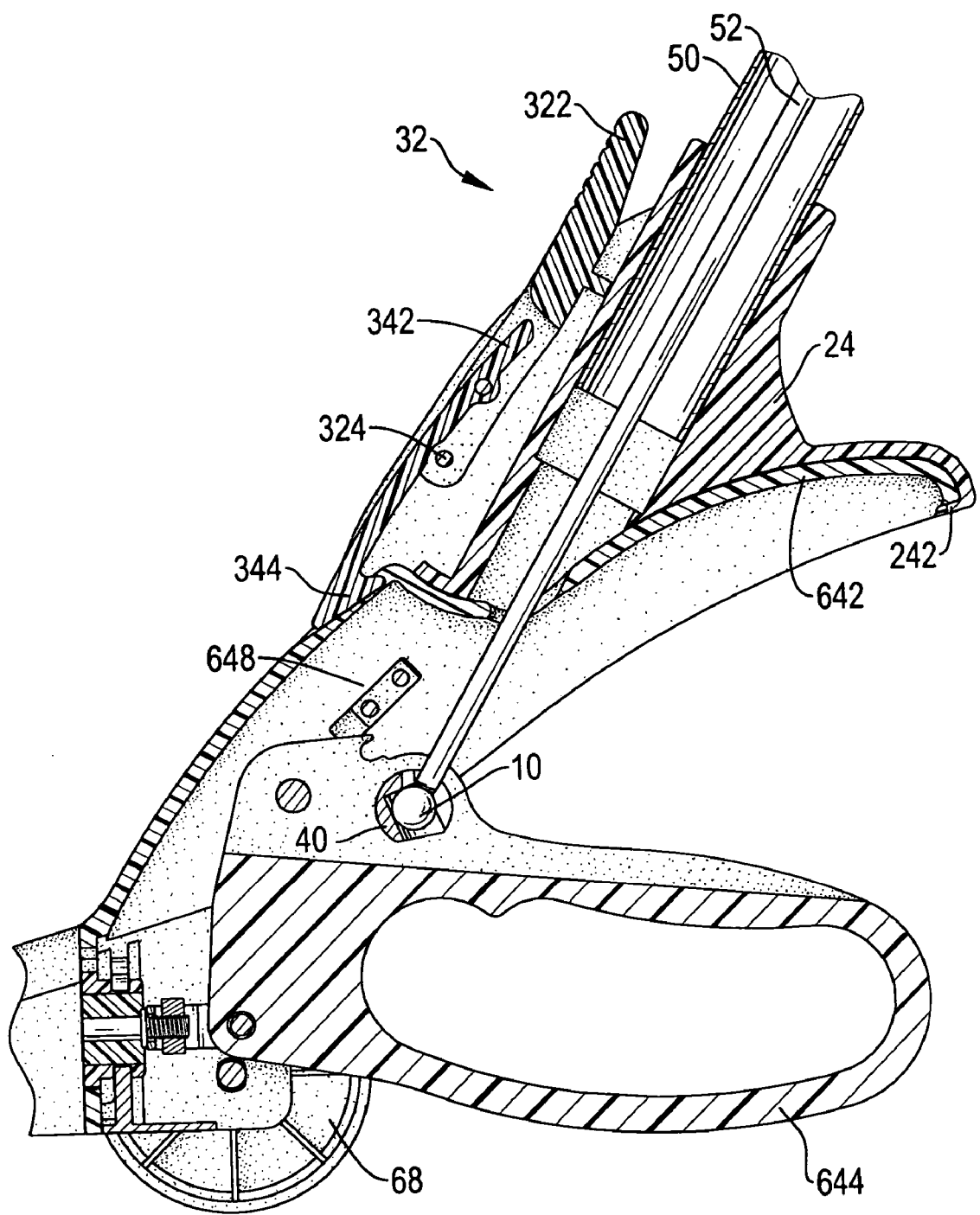
FIG. 4 is another operational side view in partial section of the connecting device and the grass shears in FIG. 3.

With reference to FIGS. 3 and 4, the rear tail (24) corresponds to and is mounted on the top of the stationary grip (642) and has a bottom surface, a rear end and a lip (242). The bottom surface corresponds to the top of the stationary handle (642). The lip (242) is formed on the rear end and hooks over the rear end of the stationary grip (642) when the base (20) is attached to the grass shears (60).

The front bracket (26) extends forward from the sleeve (22) opposite to the rear tail (24) and is composed of two parallel wings.

The clamp (30) is attached pivotally to the base (20) between the parallel wings, connects the base (20) to the grass shears (60) and comprises a lever (32), a lever pivot pin, a latch (34) and a latch pivot pin. The lever (32) selectively engages and disengages the clamp (30) and has a triggering end (322) and a pivoting end (324). The pivoting end (324) is composed of two longitudinal parallel arms attached respectively to the wings. The lever pivot pin passes through the wings and the arms on the pivoting end (324) to pivotally attach the lever (32) to the front bracket (26). The latch (34) electively attaches to the top surface of the stationary grip (642) and has a proximal end (342) and a distal end (344). The proximal end (342) pivotally attaches to the lever (32) near the pivoting end (324). The distal end (344) has a hook that selectively engages the latch notch (646) on the stationary grip (642). The latch pivot pin passes through the wings on the lever (32) and the latch (34) near the proximal end (342) to connect the latch (34) pivotally to the lever (32).

Figure 5:
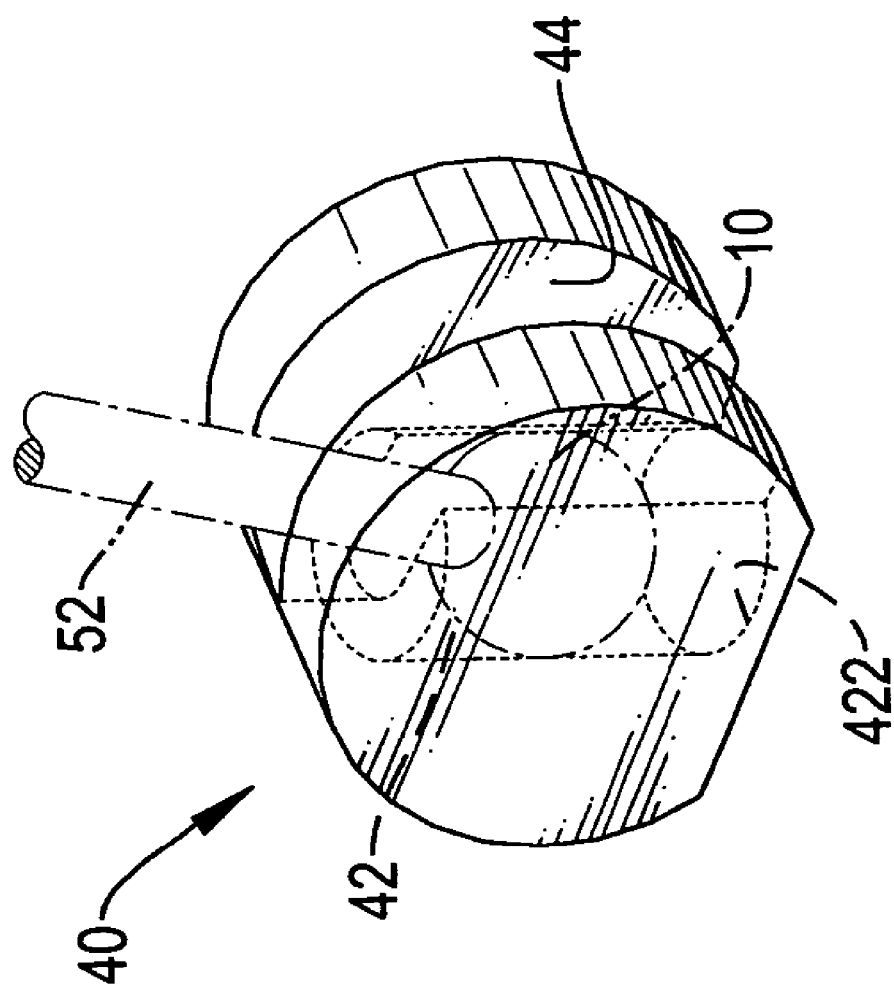
FIG. 5 is an enlarged perspective view of an engaging block in the connecting device in FIG. 3.

The engaging block (40) is movably mounted inside the transverse recess in the pivoting grip (644) and holds the ball (10) on the proximal end of the wire (52). With particular reference to FIG. 5, the engaging block (40) is a short cylinder and has a circular outer surface, a flat face, a ball recess (42) and a wire slot (44). The flat face is formed on the circular outer surface. The ball recess (42) is defined in the flat face transversely into the engaging block (40) and has an opening (422) defined on the flat face. The wire slot (44) is semicircular, is defined radially in the circular outer surface, communicates with the ball recess (42) and the opening (422) and has a width narrower than the ball recess (42) to hold the ball (10) inside the engaging block (40).

With further reference to FIGS. 3 and 4, the long-handled shears is assembled by squeezing the grips (642, 644) until the opening (422) in the ball recess (42) is revealed and aligns with the sleeve (22). To conveniently attach the operational grip stick and the connecting device to the grass shears (60), the locking device is engaged to lock the pivoting grip (644) closed. Meanwhile, the wire (52) penetrates the sleeve (22) and the ball (10) is mounted in the ball recess (42) through the opening (422). Then, the lip (242) on rear tail (24) engages the stationary grip (642), and the trigger end (322) of the lever (32) is pushed pivotally toward the base (20) to make the hook on the distal end (344) engage the latch notch (626). Then the locking device is released to release the pivoting grip (644). The engaging block (40) moves downward with the pivoting grip (644) to close the opening (422) so that the ball (10) is enclosed inside the ball recess (42) and the wire (52) extends through the wire slot (44), and the long-handled shears is assembled and ready for use.

Figure 6:
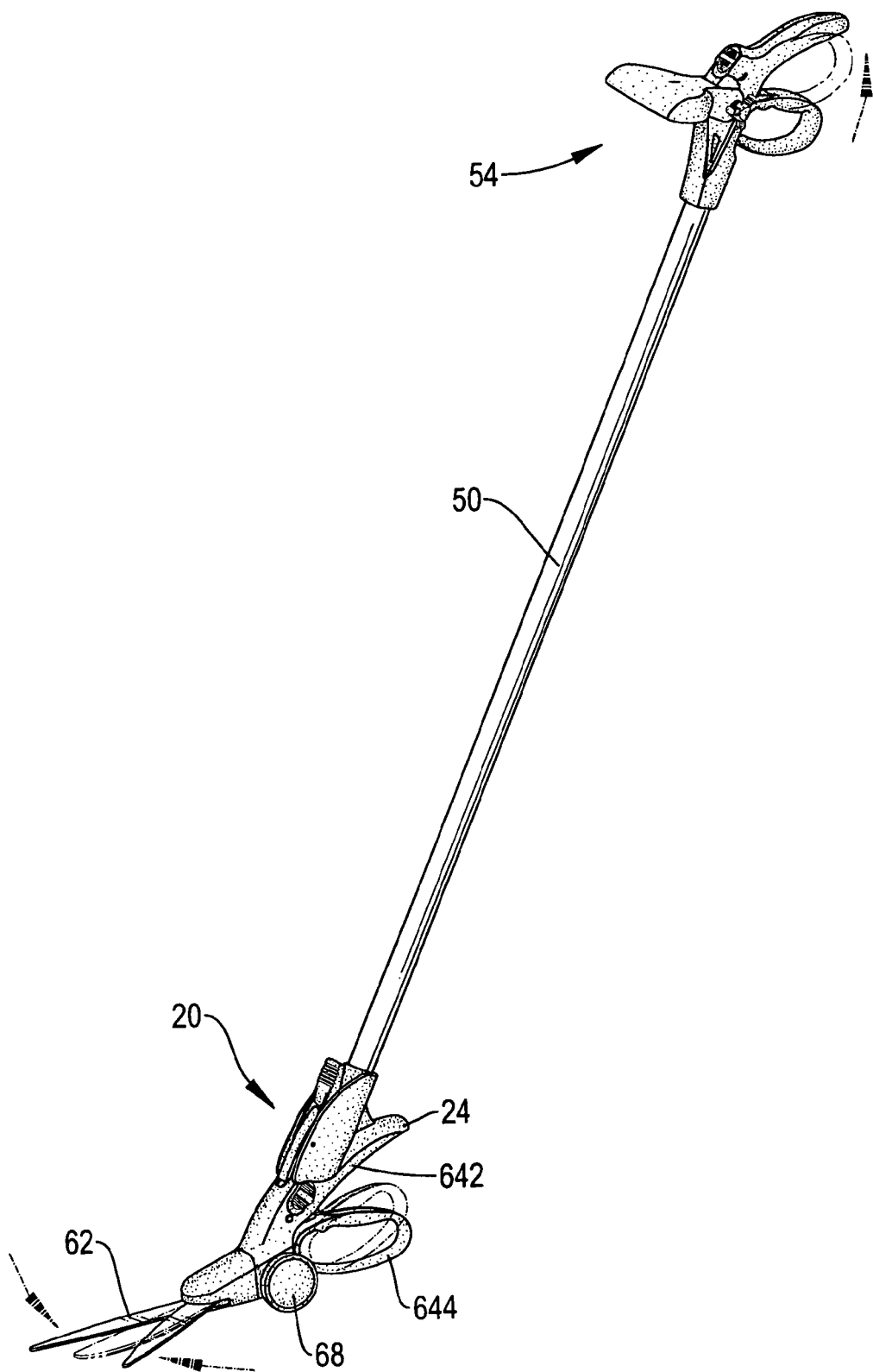
FIG. 6 is an operational perspective view of the long-handled grass shears in FIG. 1.
Figure 7:
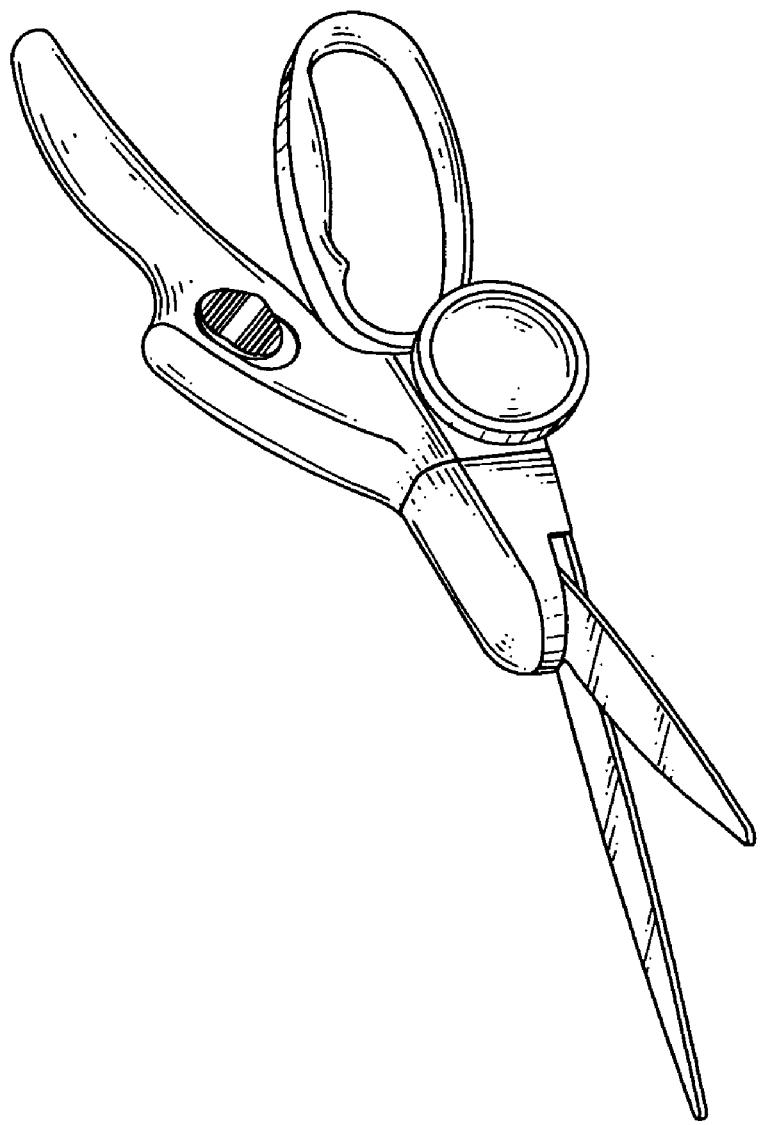
FIG. 7 is a perspective view of conventional grass shears in accordance with the prior art.

With reference to FIG. 6, the long-handled shears operates by squeezing the handle (54), which pulls the wire (52). The wire (52) pulls the pivoting grip (644) toward the stationary handle (642) and moves the blades (62). Because the engaging block (40) only reveals the ball recess (42) at the extreme position, normal operational of the grass shears (60) cannot release the ball (10) from the ball recess (42), and the grass shears (60) is safe during operation.

According to above description, the long-handled shears can be easily assembled or disassembled in a convenient way. After detaching the operational grip stick and the connecting device from the grass shears (60), the grass shears (60) can be used alone to fulfill other operational usage requirements.

Although the invention has been explained in relation to its preferred embodiments, many other possible modifications and variations can be made without departing from the spirit and scope of the invention as hereinafter claimed.

What is claimed is:

1. A long-handled shears with a detachable connecting device comprising:
   an operational grip stick having
      an elongated tube (50) being hollow and having a proximal end and a distal end;
      a handle (54) attached to the distal end of the elongated tube (50); and
      a movable wire (52) mounted through the elongated tube (50) and having
         a distal end connected to the handle (54); and
         a proximal end;
   a grass shear (60) comprising
      a stationary grip (642) being a shell and having
         a front end;
         a rear end;
         a top surface;
         two sides;
         a bottom;
         a front opening formed in the front end; and
         a top opening formed through the top surface;
      a pivoting grip (644) attached pivotally to the bottom of the stationary grip (642) and having
         a front end;
         a top surface; and
         a transverse recess formed near the top surface toward the front end;
      a pair of blades (62) attached to the front end of the stationary grip (642) such that the blades (62) pivot in a scissor movement;
      a pulling rod (66) attached to the pair of blades (62), extending through the front of the stationary grip (642) and attached to and driven by the pivoting grip (644) to make the pair of blades (62) cut; and
      a locking device attached to the grips (642,644) to selectively hold the pair of blades (62) closed when the grass shears (60) are not in use; and
   a connecting device mounted between the operational grip stick and the grass shears (60) to connect the operational grip stick to the grass shears (60) and comprising
      a ball (10) attached to the proximal end of the wire (52);
      a base (20) mounted on the proximal end of the elongated tube (50) of the operational grip stick, attached to the stationary grip (642) of the grass shears (60) and comprising:
         a top;
         a bottom;
         a front;
         a rear;
         a sleeve being hollow, formed on the top of the base (20) and holding the proximal end of the elongated tube (50) of the operational grip stick and through which the wire (52) extends;
         a clamp (30) attached pivotally to the base (20) and connecting the base (20) to the grass shears (60) and
      an engaging block (40) being a short cylinder, movably mounted inside the transverse recess in the pivoting grip (644), holding the ball (10) on the proximal end of the wire (52) and having
         a circular outer surface;
         a flat face formed on the circular outer surface;
         a ball recess (42) defined in the flat face transversely into the engaging block (40) and having an opening (422) defined on the flat face; and
         a wire slot (44) being semicircular, defined radially in the circular outer surface, communicating with the ball recess (42) and the opening (422) and having a width narrower than the ball recess (42).

2. The long-handled shears as claimed in claim 1, wherein the stationary grip (642) further has a latch notch (646) formed in the top surface toward the front end; and the clamp (30) comprises:

a lever (32) pivotally mounted on the front bracket (26) to selectively engage and disengage the clamp (30) and having
  a triggering end (322); and
  a pivoting end (324) pivotally attached to the front bracket (26);
a lever pivot pin extending through the lever (32) and the front bracket (26) to pivotally attach the lever (32) to the front bracket (26);
a latch (34) pivotally attached to the lever (32), selectively attaching to the top surface of the stationary grip (642) and having
  a proximal end (342) pivotally attaching to the lever (32) near the pivoting end (324); and
  a distal end (344) having a hook that selectively engages the latch notch (646) on the stationary grip (642); and
a latch pivot pin extending through the lever (32) and the latch (34) near the proximal end (342) to connect the latch (34) pivotally to the lever (32).

3. The long-handled shears as claimed in claim 1, wherein the base (20) further comprises
  a rear tail (24) extending from the sleeve (22), corresponding to and mounted on the top of the stationary grip (642) and having
    a bottom surface corresponding to the top of the stationary handle (642);
    a rear end; and
    a lip (242) formed at the rear end and hooking over the rear end of the stationary grip (642) when the base (20) is attached to the grass shears (60); and
  a front bracket (26) extending forward from the sleeve (22) opposite to the rear tail (24) and comprising two parallel wings; and the clamp (30) is pivotally attached on the front bracket (26).

4. The long-handled shears as claimed in claim 3, wherein the stationary grip (642) further has a latch notch (646) formed in the top surface toward the front end; and
the clamp (30) comprises:
  a lever (32) pivotally mounted on the front bracket (26) to selectively engage and disengage the clamp (30) and having
    a triggering end (322); and
    a pivoting end (324) pivotally attached to the front bracket (26);
  a lever pivot pin extending through the lever (32) and the front bracket (26) to pivotally attach the lever (32) to the front bracket (26);
  a latch (34) pivotally attached to the lever (32), selectively attaching to the top surface of the stationary grip (642) and having
    a proximal end (342) pivotally attaching to the lever (32) near the pivoting end (324); and
    a distal end (344) having a hook that selectively engages the latch notch (646) on the stationary grip (642); and
  a latch pivot pin extending through the lever (32) and the latch (34) near the proximal end (342) to connect the latch (34) pivotally to the lever (32).

5. The long-handled shears as claimed in claim 4, wherein the proximal end of the wire (52) is threaded; and
the ball (10) has a threaded hole screwing onto the threaded proximal end of the wire (52).

\* \* \* \* \*